Feb. 4, 1930.  H. P. SPARKES  1,745,870
ELECTRICAL DISTRIBUTION SYSTEM
Filed Jan. 16, 1926   2 Sheets-Sheet 1

WITNESSES:

INVENTOR
Harry P. Sparkes.
BY
Wesley G. Carr
ATTORNEY

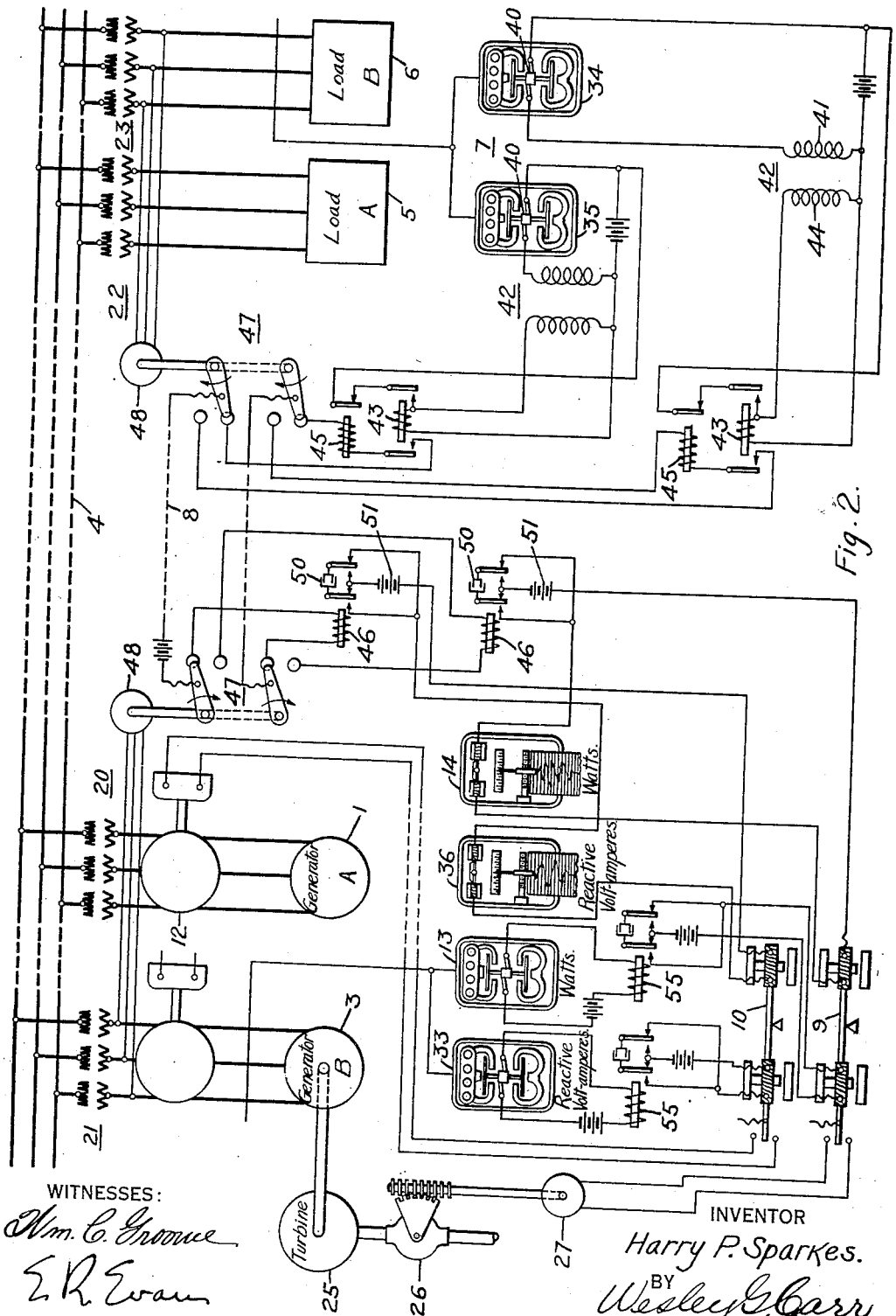

Patented Feb. 4, 1930

1,745,870

UNITED STATES PATENT OFFICE

HARRY P. SPARKES, OF PITTSBURGH, PENNSYLVANIA, ASSIGNOR TO WESTINGHOUSE ELECTRIC & MANUFACTURING COMPANY, A CORPORATION OF PENNSYLVANIA

ELECTRICAL DISTRIBUTION SYSTEM

Application filed January 16, 1926. Serial No. 81,855.

My invention relates to electrical distribution systems and particularly to systems involving a plurality of stations or of sources of energy connected to a common transmission circuit.

An object of my invention is to provide a system comprising a plurality of generating stations, a plurality of load circuits, each allocated to one of the generating stations, and means for controlling the generating stations in accordance with their respective loads.

A further object of my invention is to provide an electrical distribution system comprising a plurality of generating stations connected to a common transmission circuit and arranged in such manner that the reactive volt-ampere losses in the transmission circuit may be supplied from a single station.

In distribution systems involving a plurality of generating stations connected to a common transmission circuit, in order to permit an exchange of power when an emergency arises or when increased economies result from such an exchange, it is desired to allocate a portion of the load to each generating station under normal conditions. Furthermore, it is often desired to supply the reactive volt-ampere loss in the transmission circuit from a single generating station.

For instance, the reactive line loss may be supplied from the station with the smallest load factor or, in case the several stations are owned by competing companies, of which only one obtains any benefit from the interconnection of the stations under normal conditions, one of the conditions, imposed upon the latter company may be that it shall supply the reactive loss in the transmission circuit under normal conditions.

In accordance with my invention, a system comprising a plurality of generating stations is controlled in such manner as to distribute the load in a predetermined ratio between the respective stations and one station is so controlled as to supply the reactive volt-ampere loss in the transmission circuit or other desired portion of the total reactive load. The invention may be applied to distribution systems in which the generating stations are at the same or opposite ends of the transmission circuit and the load circuits either at the same or at the opposite ends of the circuit from the particular station to which each is allocated.

Figure 1:
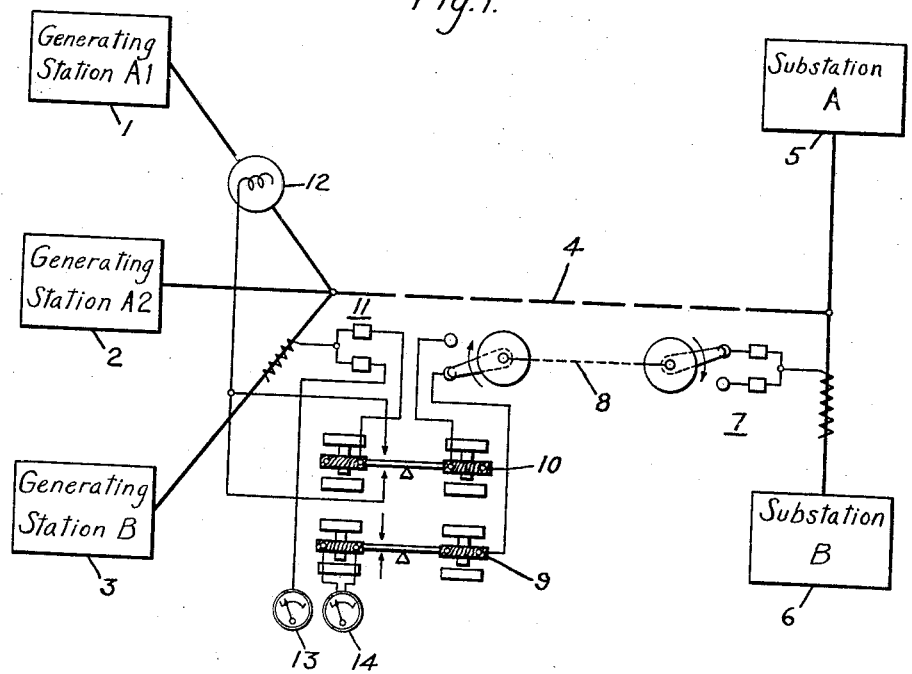
Figure 3:
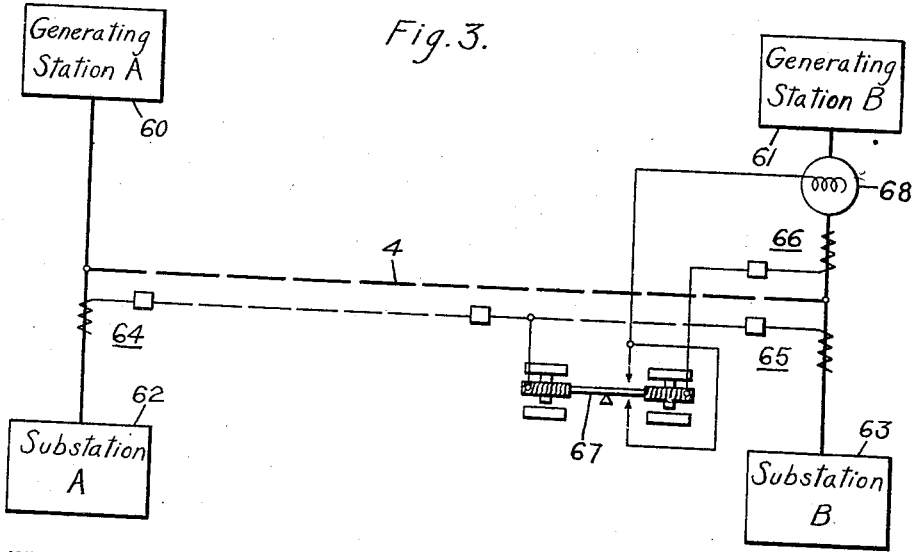

For a clearer understanding of my invention, reference should be had to the accompanying drawings, in which Fig. 1 is a diagram of an electrical distribution system embodying my invention;

Fig. 2 is a diagrammatic view showing the detailed circuits of the system shown in Fig. 1; and Fig. 3 is a diagram of a modification of the system of Fig. 1.

Referring to Fig. 1, an electrical distribution system comprises generating stations 1, 2 and 3 connected through a common high-voltage transmission circuit 4 to substations 5 and 6 for supplying the load. It is assumed that the generating stations are owned by separate companies and accordingly that the substations are each allocated to a certain generating station or stations. For instance, the generating stations 1 and 2 may be owned by a company A, which also operates the substation 5, and the generating station 3 may be owned by another company B, which operates the substation 6. The generating stations 1 and 2 are therefore controlled in accordance with the load on the substation 5 and the generating station 3 in accordance with the load on the substation 6.

Furthermore, it may be desirable to supply the reactive volt-ampere loss in the transmission circuit 4 from the generating station 1. This arrangement may be required, for example, because the generating station 1 has a low load factor, because it is adapted to operate with greater economy than the other generating stations, or because the company controlling this generating station is the only one to benefit by the interconnection of the stations under normal conditions.

For instance, while either company may benefit by the interconnection in case an emergency arises in which one of the generating stations is crippled or put out of service in some manner, under normal conditions, the generating stations 1 and 2 may be overloaded during the peak-load period of the day and therefore the company operating these stations may arrange to purchase power from the company operating the generating station 3 during these periods. If such arrangement is made, one of the requirements of the latter company may be that the other company supply the reactive volt-ampere loss in the transmission line under all conditions.

In order to accomplish this result, measuring apparatus 7 is arranged to measure the power and reactive components of the load upon the substation 6 and to transmit the same over a pilot wire or control circuit 8 to control Kelvin balances 9 and 10 in accordance with the power and reactive components of the load. Measuring apparatus 11 is provided for measuring the power and reactive components of the energy supplied by the generating station 3. The Kelvin balance 10 is jointly controlled by the reactive components of the load on the substation 6 and of the energy supplied by the generating station 3.

In case the reactive component supplied by the generating station 3 is greater or less than the reactive component of the substation 6 allocated to the said generating station, the Kelvin balance 10 is adapted to control an induction feeder regulator 12 in the supply circuit extending from the generating station 1 to the transmission circuit. The induction feeder regulator 12 is so controlled by the Kelvin balance 10 as to restore the balance between the reactive input and output of the stations 3 and 6, and the generating station 1 therefore will supply the reactive volt-ampere loss in the transmission line 4.

Two wattmeters 13 and 14 are so connected to the measuring apparatus as to indicate the power components of the loads upon the generating station 3 and the substation 6. The indications of the instruments 13 and 14 may be maintained equal or in any desired proportionality by controlling the input to the prime mover at the generating station 3.

The detailed circuits of the system shown in Fig. 1 are shown in Fig. 2. Referring to Fig. 2, the generators 1 and 3 are connected in parallel to the three-phase transmission circuit 4 through transformers 20 and 21. The substations 5 and 6 are connected to the transmission circuit 4 through step-down transformers 22 and 23, the load circuits being tapped off from the transmission circuit at spaced points thereon, as shown.

The generator 3 is driven by a prime mover 25 controlled by a valve 26 which is controlled, in turn, by the Kelvin balance 9 through a pilot motor 27. The power and reactive components of the load on generator 3 are measured by the instruments 13 and 33. The power and reactive components of the load on the substation 6 are measured by the instruments 34 and 35 which are arranged to control the instruments 14 and 36 in the generating station 3 over the pilot wire circuit 8.

The remote transmission of the instantaneous values of the load is effected in substantially the same manner as in the metering system described and claimed in the copending application of B. H. Smith (Case No. 11,313), Serial No. 711,549, filed May 7, 1924 and assigned to the Westinghouse Electric & Manufacturing Company. As shown, the transmitting instruments 34 and 35 are of the induction-motor type with the rotating element thereof provided with a commutator 40.

The commutator 40 is adapted to control the circuit of the primary winding 41 of a transformer 42, thereby intermittently energizing an impulse relay 43 connected to the secondary winding 44 of said transformer at a rate corresponding to the magnitude of the quantity measured by the measuring instrument. An auxiliary relay 45 is associated with the impulse relay 43 and is adapted to control an impulse relay 46 at the remote end of the pilot-wire circuit 8.

In order to transmit a plurality of indications over a single pilot-wire circuit, a synchronously rotating switch 47 at each end of the circuit is employed. The switch 47 may be driven by a synchronous motor 48 connected to the alternating-current distribution system. The rotation of the switches 47 alternately connects each of the relays 46 in series with each of the relays 45 through the pilot-wire circuit 8.

When the impulse relay 43 is operated by the associated measuring instrument, the relay remains locked up through a circuit including its own winding and right-hand contact member and the normally closed contact member of the relay 45. When the relay 45 is energized in series with the relay 46 at the opposite end of the pilot-wire circuit, the relay 43 becomes deenergized. However, if the relay 43 is not energized when the switches 47 connect the associated relays 45 and 46 in circuit, the latter is not energized because the circuit is open at the left-hand contact member of relay 43.

The switches 47 are arranged to operate at such rate that the relays 45 and 46 will be connected in the pilot wire circuit more frequently than the relay 43 operates under peak load conditions. Consequently, the relays 46 will be periodically energized at rates corresponding to the rates of energization of the corresponding relays 43, which correspond in turn to the magnitudes of the power and reactive components of the load on the substation 6.

The impulse relays 46 are provided with two contact members to which a condenser 50 is connected. A battery 51 or other source of constant voltage is connected in series with the contacts of the relays 46, the Kelvin balances 9 and 10 and the instruments 14 and 36. Upon each operation of the relays 46, the associated condenser 50 become charged and the condenser charging current traverses the windings of the balances 9 and 10 and the instruments 14 and 36.

The average current traversing each of the balances 9 and 10 and the windings of the instruments 14 and 36 therefore is proportional to the rate at which each of the impulse relays 46 operates or to the magnitudes of the power and the reactive components of the load on the substation 6. The instruments 13 and 33 are provided with similar impulse relays 55 controlling the current through the opposing windings of the Kelvin balances 9 and 10. If the balances 9 and 10 are considerably removed from the generator 3, for instance, if they are located in the station containing the generator 1, they may be controlled by the instruments 13 and 33 in the same manner as by the instruments 34 and 35.

If the power component of the load of the substation 6 does not equal the power component of the energy supplied by the generator 3, the equilibrium of the Kelvin balance 9 is disturbed and the pilot motor 27 is so controlled as to change the input to the prime mover 25 to restore the system to a balance. Likewise, if the reactive component of the load on the substation 6 does not equal the reactive component of the energy supplied by the generator 3, the equilibrium of the balance 10 is disturbed and the induction feeder regulator 12 is so controlled as to shift the voltage phase, to restore the system to a balance. Under these conditions, the reactive volt-ampere loss in the transmission circuit 4 is supplied by the generator 1. Instead of balancing the power and reactive components exactly, the system may be so compensated as to secure any desired distribution of the load between the respective stations.

The invention is applicable to systems in which the generating stations are at opposite ends of the transmission circuit, as shown in Fig. 3. In the system shown in this figure, the generating stations 60 and 61 are interconnected by the transmission circuit 4. The substation 62 allocated to the generating station 60 is located at the same end of the transmission circuit as the generating station and the substation 63 allocated to the generating station 61 is similarly located with respect to the transmission circuit.

It is assumed in this case that it is desired to have the generating station 60 supply the reactive volt-ampere loss in the transmission circuit 4 and the generating station 61 supply the reactive component of the total load on the system. Consequently, measuring apparatus 64 and 65 is provided for measuring the reactive components of the loads on the substations 62 and 63, respectively, and measuring apparatus 66 is provided for measuring the reactive component of the energy supplied by the generating station 61. The latter quantity is balanced upon a Kelvin-balance control element 67 against the reactive component of the total load and the balance is maintained by means of an induction feeder regulator 68 controlled by the control element 67.

Under these conditions, the generating station 61 supplies the reactive component of the load and the generating station 60 supplies the reactive volt-ampere loss in the transmission circuit 4. Such an arrangement may be desired, for instance, in case company A controlling stations 60 and 62 desires to purchase power during peak-load periods from company B controlling stations 61 and 63, but the capacity of the generating station 60 is sufficient to carry the reactive volt-ampere line loss except during peak-load conditions. Since the company B does not secure any benefit from the interconnection except the possibility of an auxiliary source of supply in case an emergency arises, it is desirable that the reactive volt-ampere loss in the transmission circuit be supplied from the generating station 60 whenever the station is not overloaded.

Many other modifications of my invention will occur to those skilled in the art and therefore, I do not wish to be limited in scope except as may be indicated in the appended claims.

I claim as my invention:

1. An electrical distribution system comprising a plurality of generating stations, a common transmission circuit therefor, a load normally individually serviced by each station and connected to said circuit for service from other stations when desired, and means for controlling one of the stations in response to a difference in the reactive components of the energy supplied by one of said stations to its individual load.

2. An electrical distribution system comprising a plurality of generating stations, a common transmission circuit therefor, and means for automatically controlling the stations to divide the reactive component of the total load in a predetermined ratio in response to a difference in the reactive components of the output of one of said stations and the input to its associated load.

3. An electrical distribution system comprising a plurality of generating stations, a common transmission circuit therefor, an induction feeder regulator in one of said stations, means for comparing the reactive component of the load supplied by another of the generating stations with the reactive component of the energy supplied by said last-mentioned generating station, and means for controlling said regulator when said components are unequal to cause said first-mentioned station to supply the reactive volt-ampere loss in the transmission circuit.

4. In combination, a distribution circuit, generating stations and loads connected thereto, each of said stations being adapted normally to supply one of said loads and adapted in emergency to supply any of said loads, and automatic means responsive to the reactive component of the output of one of said stations and to the reactive component of the input to its load for controlling another of said stations when said components are unequal to cause said other of said stations to supply the reactive component of the distribution circuit losses.

5. The combination with a transmission circuit, generators and loads connected thereto, each of said generators being normally adapted to supply one of said loads, of automatic means energized in accordance with the reactive component of the output of one of said generators and the reactive component of the input to its load for controlling another of said generators to cause it to supply the reactive component of the power loss in said circuit.

6. A distribution system, a circuit, generators connected to said circuit, and loads associated with said generators, means for governing the output of one of said generators to cause said generator to supply the reactive component of the power loss in said circuit including a relay responsive to the difference between the reactive component of the output of another of said generators and the reactive component of the input to its associated load.

7. In a distribution system, a generator connected thereto, a load supplied by said generator, a second generator connected to the system and automatic means for controlling the voltage of the second generator in accordance with the difference in the reactive component of the output of the first generator and the reactive component of the input for a predetermined load, means energized by said automatic means whereby said second generator supplies the reactive component of the power loss in said system.

8. In combination, a distribution circuit, generating stations and loads connected thereto, each of said stations being adapted normally to supply one of said loads and adapted in emergency to supply any of said loads, and automatic means responsive to the reactive component of the output of one of said stations and to the reactive component of the input to its load for controlling another of said stations when said components are unequal to cause said other of said stations to supply a predetermined proportion of the reactive component of the distribution circuit losses.

9. The combination with a transmission system, generating stations and load devices connected thereto, of a Kelvin balance responsive to the reactive components of the output of one of said stations and the input to its associated load for controlling the voltage of another of said stations.

10. An electrical distribution system comprising a plurality of generating stations, a common transmission circuit therefor, a plurality of load circuits tapped off from said transmission circuit, each load circuit being normally allocated to and serviced from one of said stations, and means energized from said circuit in accordance with the difference in the reactive components of the output of one of said stations and the input to its associated load for controlling the stations in such manner as to supply the reactive component of a predetermined portion of the total load from a single station.

In testimony whereof, I have hereunto subscribed my name this 29th day of December, 1925.

HARRY P. SPARKES.